Dec. 24, 1929.      C. H. BRASELTON ET AL      1,740,450
FUEL SUPPLY SYSTEM
Original Filed Feb. 1, 1922
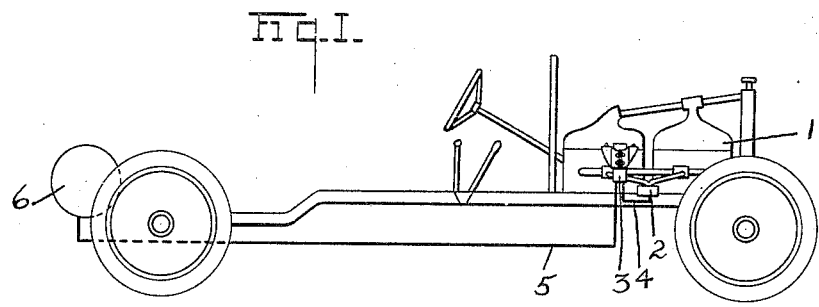
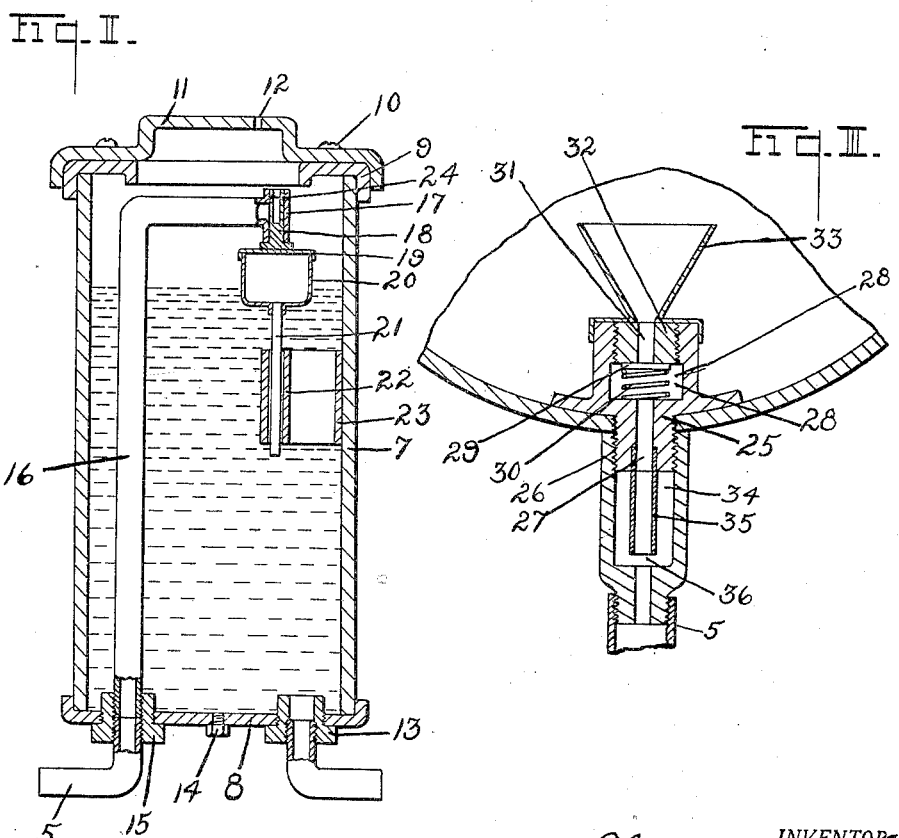
INVENTORS
Chester H. Braselton
Fred B. MacLaren
BY
Chester H. Braselton ATTORNEYS Patented Dec. 24, 1929

1,740,450

UNITED STATES PATENT OFFICE

CHESTER H. BRASELTON, OF NEW YORK, AND FRED B. MacLAREN, OF MALBA, NEW YORK; SAID MacLAREN ASSIGNOR TO SAID BRASELTON

FUEL-SUPPLY SYSTEM

Application filed February 1, 1922, Serial No. 533,494. Renewed August 7, 1924.

This invention relates to a system and mechanism for supplying fuel to an auxiliary tank for automobiles or other vehicles and has for its purpose the utilization of the inertia of the liquid fuel in the rear supply tank of lower level and in the column of liquid connecting the rear supply tank to an auxiliary tank of higher level than the carburetor for supplying the auxiliary tank with liquid fuel from which it may feed to the carburetor, or for utilizing the inertia of the liquid above mentioned to feed the same to the carburetor direct or a supply chamber adjacent to the carburetor bowl.

The inertia of the liquid is utilized due to the vibration of the automobile in going over the road where it is always apparent that a certain swaying up and down of the car exists and usually the front and rear of the car does not go upwardly or downwardly at the same time at least to the same amount or with the same speed. The system is for pumping liquid from the rear supply tank to an auxiliary tank or the carburetor near the front end of the car and by suitable valve mechanism we propose to utilize the inertia of the liquid in the rear tank and the feed pipe to keep a sufficient supply of liquid fuel at the front of the machine either in an auxiliary supply tank of higher level than the carburetor or in a chamber adjacent the carburetor bowl.

In the drawings which accompany and form a part of this specification,

Figure I represents an automobile with our invention applied thereto.

Figure II shows a vertical cross section of the auxiliary tank.

Figure III shows a detail of the valve mechanism forming the outlet for the rear tank.

In Figure I the engine of the automobile is designated at 1, the carburetor at 2, and the auxiliary supply tank at the front of the car near the carburetor at 3 this being connected with the carburetor by a supply pipe 4. The auxiliary tank 3 is connected through pipe 5 with the rear main supply tank 6 at a lower level normally than the auxiliary tank. Other parts of the automobile are merely shown in a conventional way, they having nothing to do with this invention.

In Figure II, 7 represents the side walls of the auxiliary tank having a bottom 8 pressed over the lower end in a gas tight manner. A ring 9 is permanently fastened over the top edge of the tank 7 and on to this is fastened by screws 10 the main cap 11 having a small aperture 12 to provide atmospheric pressure at all times within the inside of the auxiliary tank. In the bottom of the tank is screwed a coupling 13 into which fits the upper end of pipe 4 leading to the carburetor. A screw plug 14 is also fastened in the bottom of the tank and adapted to be removed for draining the tank. The bottom of the tank also has a nut 15 screwed therein and threaded on its interior so that the same may form a connection between feed pipe 5 from the rear tank and vertical pipe 16 in the inside of the auxiliary tank. This pipe 16 is turned over at its upper end and carries a guide 17 in which fits a stem 18 of a member carried by the top plate 19 of a float 20 which has a depending rod 21 fitting in a guide hole 22 in a bracket 23 attached to the side of the tank. The guide 22 together with the part 17 forms a guide for the float which, if there is not sufficient liquid in the auxiliary tank, will rest upon the top of the guide 22. When this is the case, the stem 18 is sufficiently lowered that the lower end of slot 24 in the stem 18 is below the bottom of guide 17 and opens the upper end of pipe 16 to the atmosphere in the top of the tank. Or, when the float is sufficiently lowered, the upper end of the stem 18 will be sufficiently low that it will be below the height necessary to close the upper end of the pipe 16 from the space in the top of the tank so that a free outlet of liquid from the pipe 16 into the auxiliary tank is permitted. When the liquid in the tank is sufficiently high however, the float is elevated to the position shown in Figure II and the upper end of pipe 16 is closed so that no amount of pressure through the pipe 5 from the rear tank caused by its motion and the motion of the liquid in it, will cause liquid to flow by the valve stem 18 into the tank.

Figure III shows a detail of the connection of pipe 5 to the rear tank and in this figure 25 represents a nut screwing in the bottom of the rear tank from the rear side and having a thread portion 26 for connecting the pipe 5 thereto. This nut has an opening 27 and a valve chamber 28 in which is a valve 29 spring pressed upwardly by spring 30 to close an opening 31 in a nut 32 screw threaded in the upper part of the valve chamber. A funnel shaped member 33 is fastened over the top of the nut 25, the funnel terminating in the opening 31. This valve mechanism is located as near the bottom of the rear tank as possible and directed in such a direction that the movement of the liquid in the rear tank when the automobile is moving will cause it to flow with pressure down the funnel and open the valve 29 so that some of the liquid will force itself beyond the valve 29 and push the liquid in the pipe 5 forward so that some of it will flow out through pipe 16 past slide valve 18 into the upper part of the auxiliary tank, in case the level in the auxiliary tank is not sufficiently high so that the float closes the slide valve. If the level in the auxiliary tank is sufficiently high to hold the float elevated so that the slide valve at the upper end of pipe 16 is closed, then this valve will prevent any forward movement of liquid fuel through the pipe 5.

It will be obvious that inasmuch as the automobile in traveling over the road has its rear tank as well as the auxiliary tank at the front subjected to vibration up and down as well as sidewise and in an irregular manner that the movement of the liquid in the rear tank will naturally at times cause some of it to fall with some force into the funnel 33 and that this force will be sufficient to move some of the liquid from the rear tank forwardly through the pipe 5 to the auxiliary tank unless the valve 18 in the auxiliary tank is closed. The check valve at the rear tank of course serves to hold any liquid which is passed forward of it from returning to the rear tank either by gravity or as the result of vibrations of the car. It is found in practice that with a pipe 5 of the proper area in cross section so that the resistance to the flow of liquid is small as possible, for all ordinary driving or in fact in any case of driving whatever, sufficient fuel will in this way be fed from the rear tank to the auxiliary tank to keep the carburetor supplied with fuel at all times. It is desired however that the auxiliary tank be made of sufficient size so that its capacity is sufficient to take care of the worst conditions for a sufficient length of time such as when the car is going up a long hill in which case the capacity of the auxiliary tank should be such that there is sufficient fuel in it to supply the engine until the car again reaches a substantially level condition at the top of the hill.

If desired we may provide an air chamber or its equivalent such as a chamber in communication with the pipe 5 in which there is a spring pressed piston, for the purpose of providing a yielding portion of the feed pipe 5 the space of which can be filled against the pressure of the air or of the spring as the liquid is forced forward in the pipe 5 towards the auxiliary tank. When the pressure in the rear tank then recedes the energy which is stored up in air chamber or cushion will then tend to continually force out liquid in the pipe 5 on into the auxiliary tank. By this means sudden stopping and starting of the column of liquid in the pipe 5 is decreased or eliminated and a more continuous flow through the pipe 5 is provided even though the pressure in the rear tank due to the inertia of the liquid in it is intermittent. We prefer to place this air cushion or yielding means as near to the rear tank as possible. One form of the air chamber is shown in Figure III inserted between the nut 25 and the pipe 5 this having an air space 34 around the tube 35 but communicating with the opening in the tube at a point 36. By this construction a yielding pressure of air will be built in the top of the space 34 so as to provide for more continuous action as above described.

Having described our invention what we claim is:

1. In a fuel feed system for automotive vehicles, a main fuel tank, an auxiliary high level tank, a conduit connecting the two tanks, and means to utilize the inertia of the mass of fuel in the main tank to cause the relative motion between the fuel and tank as the latter moves in response to undulations in the road to pump fuel to the auxiliary tank.

2. In a fuel feed system for automotive vehicles, a main fuel tank, an auxiliary high level tank, a conduit connecting the two tanks, means to utilize the inertia of the mass of fuel in the main tank to cause the relative motion between the fuel and tank as the latter moves in response to undulations in the road to pump fuel to the auxiliary tank, and means controlled by the level of fuel in the auxiliary tank to interrupt the pumping action.

3. In a fuel feed system for automotive vehicles, a main fuel tank, an auxiliary high level tank, a conduit connecting the two tanks, means to utilize the inertia of the mass of fuel in the main tank to cause the relative motion between the fuel and tank as the latter moves in response to undulations in the road to pump fuel to the auxiliary tank, and float operated means controlled by the level of fuel in the auxiliary tank to close the upper end of said conduit.

4. In a fuel feed system for automotive vehicles, a main fuel tank, an auxiliary high level tank, a conduit connecting the two tanks, means to utilize the inertia of the mass of fuel in the main tank to cause the relative motion between the fuel and tank as the latter moves in response to the undulations in the road to pump fuel to the auxiliary tank, and a float operated slide valve controlled by the level of fuel in the auxiliary tank to interrupt the pumping action.

5. In a fuel feed system for automotive vehicles, a main fuel tank, an auxiliary high level tank, a conduit connecting the two tanks, means to utilize the inertia of the mass of fuel in the main tank to cause the relative motion between the fuel and tank as the latter moves in response to the undulations in the road to pump fuel to the auxiliary tank, and a float operated valve movable transversely of the conduit and controlled by the level of fuel in the auxiliary tank to interrupt the pumping action.

6. In a fuel feed system for automotive vehicles, a main fuel tank, an auxiliary high level tank, a conduit leading from the base of the main tank to the said auxiliary tank, means to utilize the inertia of the mass of fuel in the main tank to cause relative motion between the fuel and tank as the latter moves in response to the undulations of the road, to set up a series of rapidly recurring pumping impulses for lifting the fuel from the main tank to the auxiliary tank.

7. In a fuel feed system for automotive vehicles, a main fuel tank, an auxiliary high level tank, a conduit leading from the base of the main tank to the said auxiliary tank, means to utilize the inertia of the mass of fuel in the main tank to cause relative motion between the fuel and tank as the latter moves in response to the undulations of the road, to set up a series of rapidly recurring pumping impulses for lifting fuel from the main tank into the auxiliary tank, and means controlled by the level of fuel in the auxiliary tank to interrupt the pumping action.

8. In a fuel feed system for automotive vehicles, a main fuel tank, an auxiliary high level tank, a conduit leading from the base of the main tank to the said auxiliary tank, said conduit having a flared connection with said main tank, and means including a check valve in said conduit opening towards the said auxiliary tank, to utilize the inertia of the mass of fuel in the main tank to cause relative motion between the fuel and tank as the latter moves in response to undulations in the road to set up a series of rapidly recurring impulses for lifting fuel from the main tank into the auxiliary tank.

9. In a fuel feed system for automotive vehicles, a main fuel tank, an auxiliary high level tank, a conduit leading from the base of the main tank to the said auxiliary tank, means including a check valve in said conduit, to utilize the inertia of the mass of fuel in the main tank to cause relative motion between the fuel and tank as the latter moves in response to the undulations in the road to set up a series of rapidly recurring pumping impulses for lifting fuel to the auxiliary tank, and means within the conduit tending to absorb said impulses and produce a steady flow of liquid therethrough.

10. In a fuel feed system, a main supply tank; an auxiliary high level tank; a conduit connecting the base of said main tank with said auxiliary tank; means to utilize the inertia of the mass of fuel in the main tank to raise said fuel to said auxiliary tank, said means including a funnel-shaped opening from said main tank into said conduit whereby movement toward said conduit of a column of fuel tends to increase the velocity of the fuel into said conduit.

11. In a fuel feed system, a main supply tank; an auxiliary higher level tank; a conduit connecting the base of said supply tank with said auxiliary tank; a funnel shaped neck on the end of said conduit extending into said supply tank whereby movement of the fuel in said supply tank toward said conduit produces a flow of fuel into said conduit; a check valve in said conduit preventing the return of said fluid to said supply tank; and means in said auxiliary tank to close said conduit and prevent the flow of fuel therethrough when the fuel rises above the predetermined level in said auxiliary tank.

12. In a fuel feed system, a main supply tank; an auxiliary higher level tank; a conduit connecting the base of said supply tank with said auxiliary tank; means to utilize the inertia of the fuel in said supply tank to raise said fuel to said auxiliary tank, said means including a funnel-shaped opening from said supply tank into said conduit whereby motion of the fuel toward said conduit will cause a portion of the fuel to be forced therethrough; means in said auxiliary tank to close said conduit when the level of the fuel in said auxiliary tank rises above a predetermined height; and an air cushion in said conduit to absorb sudden impulses and even the flow of fuel therethrough.

In testimony whereof, we affix our signatures.

CHESTER H. BRASELTON.
FRED B. MacLAREN.